(12) United States Patent
Kouta

(10) Patent No.: US 7,762,915 B2
(45) Date of Patent: Jul. 27, 2010

(54) BELT-TYPE CONTINUOUSLY VARIABLE TRANSMISSION

(75) Inventor: Jouji Kouta, Shizuoka (JP)

(73) Assignee: JATCO Ltd, Fuji-shi (JP)

( * ) Notice: Subject to any disclaimer, the term of this patent is extended or adjusted under 35 U.S.C. 154(b) by 1237 days.

(21) Appl. No.: 11/144,608

(22) Filed: Jun. 6, 2005

(65) Prior Publication Data
US 2005/0272539 A1 Dec. 8, 2005

(30) Foreign Application Priority Data
Jun. 7, 2004 (JP) ............................. 2004-169054

(51) Int. Cl.
*F16H 59/00* (2006.01)
*F16H 63/00* (2006.01)

(52) U.S. Cl. .......................................... 474/18; 474/28
(58) Field of Classification Search .............. 474/8–28; 384/540, 542, 584, 585
See application file for complete search history.

(56) References Cited

U.S. PATENT DOCUMENTS

| | | | |
|---|---|---|---|
| 3,704,634 A | | 12/1972 | Schrodt |
| 5,006,092 A | * | 4/1991 | Neuman et al. ................. 474/8 |
| 5,361,744 A | * | 11/1994 | Teraoka ...................... 123/561 |
| 6,241,635 B1 | * | 6/2001 | Schmid et al. ................. 474/11 |
| 6,561,934 B2 | * | 5/2003 | Kashiwase .................... 474/28 |
| 2002/0011148 A1 | | 1/2002 | Weissflog |
| 2002/0142870 A1 | * | 10/2002 | Okano et al. .................. 474/28 |
| 2003/0092517 A1 | * | 5/2003 | Muller ........................ 474/18 |

FOREIGN PATENT DOCUMENTS

| | | |
|---|---|---|
| DE | 20 19 848 A1 | 11/1971 |
| DE | 21 18 083 A1 | 1/1973 |
| EP | 0 777 069 A1 | 6/1997 |
| EP | 1 158 207 A1 | 11/2001 |
| JP | 04-107351 A | 4/1992 |
| JP | 04-140543 A | 5/1992 |
| JP | 10-205594 A | 8/1998 |
| JP | 2002-039302 A | 2/2002 |
| JP | 2005-273731 A | 10/2005 |

* cited by examiner

*Primary Examiner*—John Q Nguyen
*Assistant Examiner*—Robert T Reese
(74) *Attorney, Agent, or Firm*—Foley & Lardner LLP

(57) ABSTRACT

In a continuously variable transmission, a primary pulley includes a first fixed sheave coupled with an input rotation shaft, and a first movable sheave configured to move on the input rotation shaft in an axial direction of the primary pulley; and a secondary pulley includes a second fixed sheave, and a second movable sheave. At least one of the primary and secondary pulleys further includes an axially fixed wall configured to rotate together with the corresponding rotation shaft; and a movable cylinder configured to move together with the corresponding movable sheave, cooperating with the fixed wall to define a cylinder chamber of the corresponding pulley, and having a cylindrically-shaped opening axially outside of the cylinder chamber, the movable cylinder being laid out to permit the opening to axially overlap with at least a portion of a bearing which rotatably supports the corresponding rotation shaft.

16 Claims, 3 Drawing Sheets

BELT-TYPE CONTINUOUSLY VARIABLE TRANSMISSION

BACKGROUND OF THE INVENTION a) Field of the Invention

The present invention relates to a belt-type continuously variable transmission which is capable of varying speed ratio by stepless shifting.

b) Description of the Related Art

A Japanese Patent Application Kokai Publication No. 2002-39302 published on Feb. 6, 2002 exemplifies a previously proposed belt-type continuously variable transmission. In this proposed belt-type continuously variable transmission, a movable hydraulic cylinder defines a part of a cylinder chamber and moves together with a movable sheave of a primary pulley. An (side-case side) end portion of this movable hydraulic cylinder (i.e., an end portion in a direction opposite to a fixed sheave), is located at the same position as an (side-case side) end portion of a fixed wall, relative to an axial direction of the primary pulley. It is favorable that a bearing for supporting a rotation shaft is fixed in both directions, i.e., the axial direction and a radial direction of the rotation shaft. Hence, a plate for fixing the bearing is interposed between the fixed wall and the bearing. Thus, the bearing is fixed by the plate and a supporting portion extending from the side-case.

SUMMARY OF THE INVENTION

However, in the above-described previously proposed belt-type continuously variable transmission, the bearing is disposed outside the movable cylinder (i.e., disposed closer to the side-case) relative to the axial direction. Namely, the bearing is disposed to a side-case direction (i.e., the direction opposite to the fixed sheave) more than the movable cylinder. Moreover, the plate is interposed between the fixed wall and the bearing. Hence, (the whole length of) the continuously variable transmission becomes long in the axial direction. Therefore, a restriction on installation of the transmission into an automotive vehicle, is increased.

It is, therefore, an object of the present invention to provide a belt-type continuously variable transmission devised to be capable of being shortened in length in the axial direction.

According to one aspect of the present invention, there is provided a continuously variable transmission comprising: a primary pulley including a first fixed sheave coupled with an input rotation shaft, and a first movable sheave configured to move on the input rotation shaft in an axial direction of the primary pulley; and a secondary pulley connected with the primary pulley by a belt, the secondary pulley including a second fixed sheave coupled with a follower rotation shaft disposed substantially parallel to the input rotation shaft, and a second movable sheave configured to move on the follower rotation shaft in the axial direction, at least one of the primary and secondary pulleys including an axially fixed wall configured to rotate integrally with the corresponding rotation shaft, and a movable cylinder, configured to move and rotate integrally with the corresponding movable sheave, and cooperating with the fixed wall to define a cylinder chamber of the corresponding pulley, and having a cylindrically-shaped opening axially outside of the cylinder chamber, the movable cylinder being arranged to permit the opening to axially overlap with at least a portion of a bearing which rotatably supports the corresponding rotation shaft.

The other objects and features of this invention will become understood from the following description with reference to the accompanying drawings.

DETAILED DESCRIPTION OF THE PREFERRED EMBODIMENT

Figure 1:
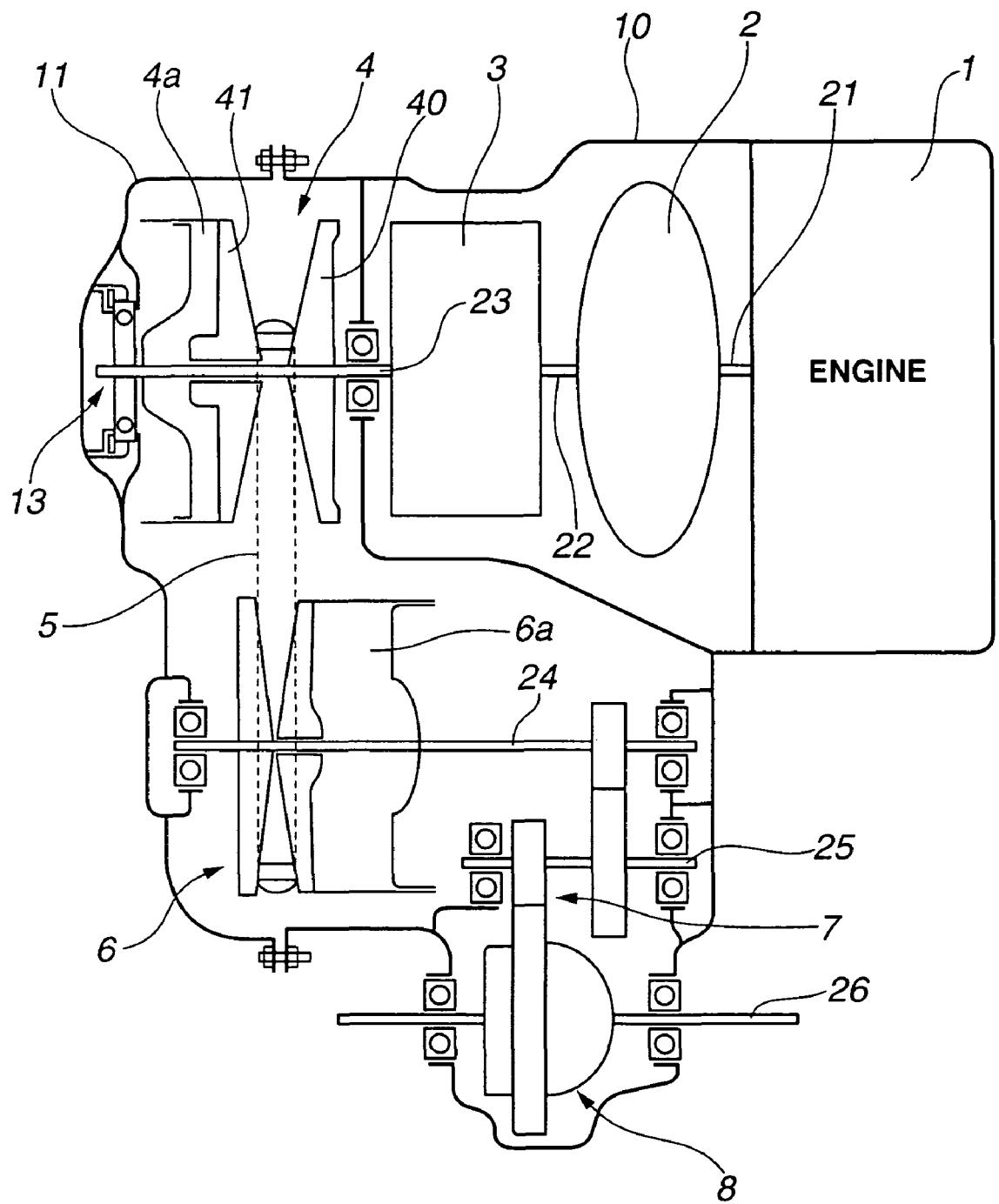
FIG. 1 is a schematic diagram representing a configuration of a belt-type continuously variable transmission of a first preferred embodiment according to the present invention.

Reference will hereinafter be made to the drawings in order to facilitate a better understanding of the present invention. FIG. 1 is a schematic diagram representing a configuration of a belt-type continuously variable transmission of a first preferred embodiment according to the present invention. An engine 1 connected to a torque converter 2, a forward/reverse (rotation) switching mechanism (or, unit) 3, a case 10 which encloses a part of the belt-type continuously variable transmission, and a side-case 11 which covers an axial end portion of case 10, are shown. An output axis (or, shaft) 21 of engine 1 is connected to torque converter 2. Torque converter 2 is equipped with, so-called, a lockup mechanism. Hence, torque converter 2 outputs rotation having increased torque to a turbine axis 22 when a required driving force is relatively large. At other times, torque converter 2 outputs rotation of output axis 21 directly to turbine axis 22 through the lockup mechanism. A transmission case is largely composed of case 10 and side-case 11.

The rotation outputted to turbine axis 22 is transmitted to a transmission input (rotation) shaft (or, axis) 23 through forward/reverse switching mechanism 3. The belt-type continuously variable transmission varies the rotation (speed) transmitted to transmission input shaft 23, and outputs a varied rotation speed to a follower axis (or, shaft) 24. Then the varied rotation is transmitted to a differential mechanism 8 and a drive axis 26 via an idler axis 25 and a final speed reducer 7.

The belt-type continuously variable transmission includes a primary (or, drive) pulley 4 disposed on transmission input axis 23 (i.e., connected to transmission input shaft 23), a secondary (or, driven) pulley 6 disposed on follower axis 24 (i.e., connected to follower shaft 24), and a belt 5 wound between primary pulley 4 and secondary pulley 6. Secondary pulley 6 is connected with primary pulley 4 by (or, via) belt 5. Primary pulley 4 includes a (axially) fixed sheave 40 formed with (or, coupled with) transmission input shaft 23 in an integrated fashion, and a movable sheave 41 which can move on (or, along) transmission input shaft 23 in an axial direction of primary pulley 4.

A primary cylinder chamber 4a is formed at a position between a side-case 11 and movable sheave 41 (i.e., formed at a side-case i's side of movable sheave 41). A groove width between fixed sheave 40 and movable sheave 41 is controlled (or, adjusted) by means of a pressure based on hydraulic pressure supplied to primary cylinder chamber 4a. In addition, secondary pulley 6 also has a similar configuration to primary pulley 4. Namely, secondary pulley 6 includes a fixed sheave coupled with follower rotation shaft 24 disposed substantially parallel to input rotation shaft 23, and a movable sheave configured to move on follower rotation shaft 24 in the axial direction. So, a groove width of secondary pulley 6 is controlled by a pressure based on hydraulic pressure supplied to a secondary cylinder chamber 6a. Thereby, speed ratio is varied (or, shift is achieved) according to pressure difference between primary cylinder chamber 4a and secondary cylinder chamber 6a.

Figure 2:
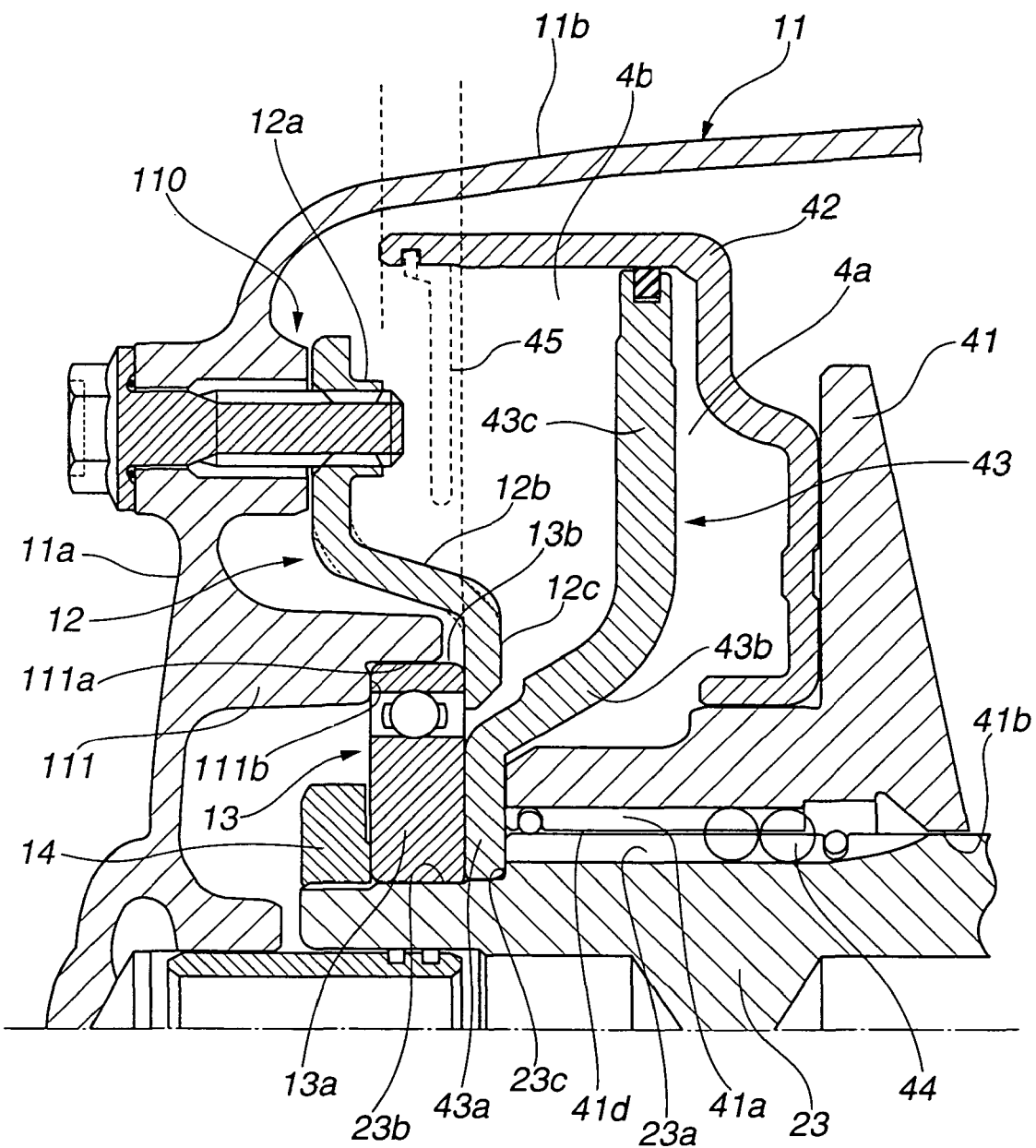
FIG. 2 is an enlarged sectional view representing an area around a cylinder chamber of a primary pulley in the first embodiment.

FIG. 2 is an enlarged sectional view representing an area around primary cylinder chamber 4a under the condition that the groove width of primary pulley 4 is widest, namely, under the lowest speed ratio. One end portion of a movable hydraulic cylinder 42 is open toward side-case 11 (i.e., open in a left direction in FIGS. 1 and 2, or open in the direction opposite to fixed sheave 40), and another end portion thereof is fixedly mounted on (or, in contact with) a back surface of movable sheave 41. Namely, hydraulic cylinder 42 is in a substantially bottomed-cylindrical shape (i.e., has substantially U-shaped cross section in the axial direction), and has a cylindrically-shaped opening, axially outside of cylinder chamber 4a. Hence, movable hydraulic cylinder 42 moves and rotates as a unit with movable sheave 41. A centrifugal cancellation plate 45 is attached at an end portion of the opening of hydraulic cylinder 42. A centrifugal cancellation space 4b is formed between (or, defined by) centrifugal cancellation plate 45 and an (axially) fixed wall 43. Fixed wall 43 is configured to rotate as a unit with the input shaft 23. Centrifugal cancellation space 4b retains centrifugal hydraulic pressure due to rotation thereof, thereby generates centrifugal cancellation pressure which cancels, at least, a part of centrifugal hydraulic pressure within primary cylinder chamber 4a. Thereby, high accurate shift control can be achieved even in a high speed rotational region.

At a radially inner side of (i.e., in a radially inner surface of) movable sheave 41, movable sheave 41 includes axial groove (s) 41a formed at approximately regular intervals along an inner circumference of movable sheave 41, and includes a sealing surface 41b which seals a transmission input shaft 23 and the inner circumference surface (or, radially inner surface) of movable sheave 41. A radius of sealing surface 41b relative to a rotation axis of primary pulley 4, is approximately the same as a radius of a sliding surface 41d which links axial grooves 41a to one another. Advantages with respect to this matching in radius magnitude between sealing surface 41b and sliding surface 41d (i.e., the matching between a sealing radius and a sliding radius), will be described later.

In a circumference surface (i.e., peripheral surface) of transmission input shaft 23, transmission input shaft 23 includes shaft-side axial groove(s) 23a as opposed to axial groove 41a. A ball bearing 44 is enclosed (or, interposed) in a passage defined (or, formed) by axial groove 41a and shaft-side axial groove 23a to allow (or, enable) movable sheave 41 to smoothly move in the axial direction. Fixed wall 43 constituting a part of primary cylinder chamber 4a is fixed on (or, fixed in contact with) an outer circumference (surface) of a side-case side's end portion 23b of transmission input shaft 23 (i.e., end portion 23b is located at a transmission input shaft 23's part being opposite to fixed sheave 40). Fixed wall 43 cooperates with hydraulic cylinder 42 to define cylinder chamber 4a of primary pulley 4. This fixed wall 43 includes a first extending portion 43a which radially (or, in a radius direction, or vertically) extends in the form of a disc from side-case side's end portion 23b, a second extending portion 43b which extends in the form of an annular ring toward movable sheave 41 (side) from a radially outer end of first extending portion 43a, and a third extending portion 43c which radially (or, in a radial direction, or vertically) extends from a radially outer end of second extending portion 43b up to an inner circumference of hydraulic cylinder 42. First extending portion 43a extends radially at a substantially right angle to the axial direction.

A bearing 13 which rotatably supports transmission input shaft 23 is mounted adjacent to (or, in contact with) (a side-case side of) first extending portion 43a, in the axial direction. Bearing 13 includes an inner ring 13a which has an approximately same radius as the outer end of first extending portion 43a, and an outer ring 13b whose outside radius is larger than that of the outer end of first extending portion 43a. Outer ring 13b is fixed to side-case 11. Moreover, inner ring 13a is fixedly fastened to first extending portion 43a (thereby to transmission input shaft 23) between (or, by means of) a nut 14 and a barrier portion 23c formed on transmission input shaft 23.

Side-case 11 is largely composed of a vertical (or, longitudinal) wall 11a which covers primary pulley 4 and secondary pulley 6 in the axial direction, and a lateral (or, horizontal) wall 11b which covers primary pulley 4 and secondary pulley 6 in the radial (or, radius) direction. Lateral wall 11b extends in the axial direction from vertical wall 11a. Vertical wall 11a is equipped with a first support member 111 which supports outer ring 13b of bearing 13, and a second support member 12 which supports outer ring 13b of bearing 13 in the axial direction. In addition, first support member 111 is so formed as to be integral with side-case 11. Second support member 12 is fixed to vertical wall 11a with a bolt.

First support member 111 includes a radial-direction support portion 111a which supports outer ring 13b in the radial direction, and a first axial-direction support portion 111b which supports outer ring 13b toward movable sheave 41. Second support member 12 includes a connecting portion 12a which is fixedly connected to side-case 11 by the bolt located outside of first support member 111 in the radial direction, an axial-direction extending portion 12b which extends toward (or, in a direction to) movable sheave 41 from side-case 11, and a second support portion 12c which (fixedly) supports outer ring 13b against vertical wall 11a in the axial direction. Second support portion 12c is in contact with (or, is contacted with) outer ring 13b. Both first extending portion 43a of axially fixed wall 43 and second support portion 12c fixedly support bearing 13 on an identical side of bearing 13 relative to the axial direction. Second support portion 12c extends from axial-direction extending portion 12b to the internally radial direction. (It is noted that second support portion 12c is hereinafter also called outer ring support portion 12c.)

Thereby, in the radial direction, the end of a center-side of second support member 12 (i.e., the end of radially inner side of second support member 12) is located outside the end of an (radially) outer side of first extending portion 43a. In other words, the center-side end of second support member 12 is positioned more externally in the radial direction than the outer end of first extending portion 43a. Moreover, second extending portion 43b prevents fixed wall 43 from contact with second support member 12. Hence, fixed wall 43 can be disposed immediately adjacent to bearing 13. Namely, it is not necessary that such a fixing plate as described above in the related art is interposed between fixed wall 43 and bearing 13. Therefore, in this embodiment according to the present invention, the length of continuously variable transmission can be shortened (i.e., the size of continuously variable transmission can be reduced) in the axial direction. Furthermore, connecting portion 12a is configured to be offset (or, shifted) from second support portion 12c in the axial direction. Hence, it becomes possible that an area for axial (direction) movement of centrifugal cancellation space 4b is secured (or, ensured). Thereby, bearing 13 can be disposed to movable sheave 41 direction (i.e., to a right direction in FIG. 2) more than the end of the opening of hydraulic cylinder 42. Namely, the opening of hydraulic cylinder 42 axially overlaps with at least a part of bearing 13, under the condition where the groove width of primary pulley 4 is widest (namely, under the lowest speed ratio), or under the condition where hydraulic cylinder 42 is shifted to a predetermined axial position corresponding to a minimum volume of cylinder chamber 4a.

Figure 3A:
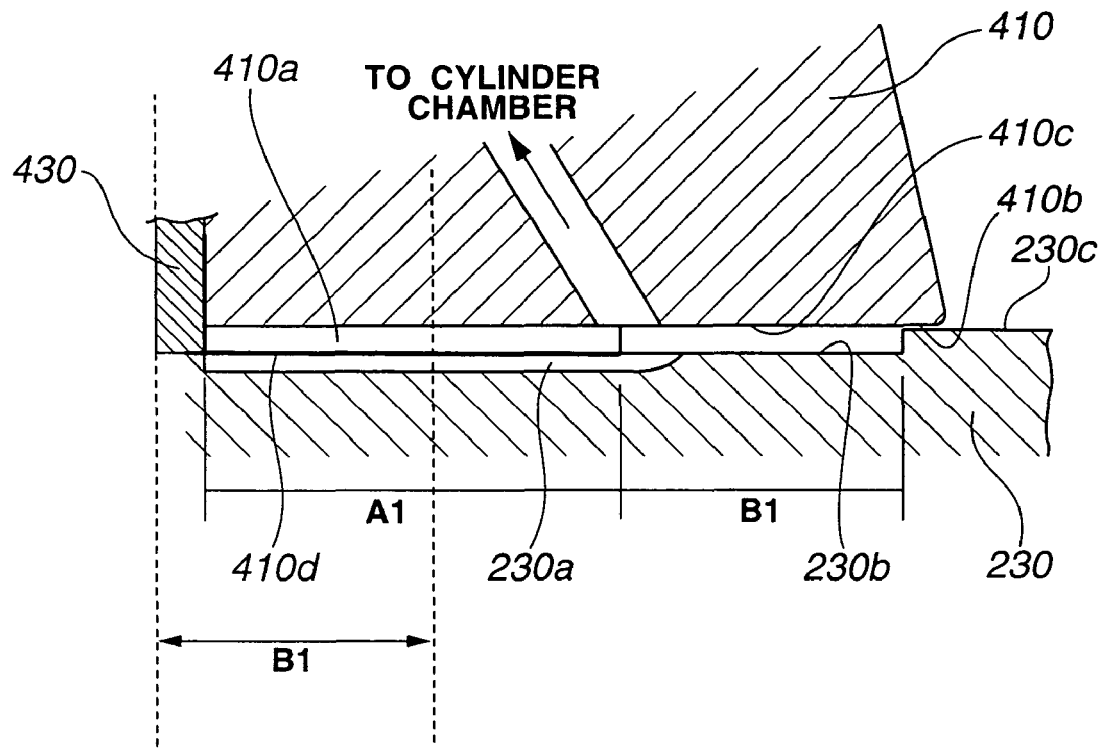
FIG. 3A is a schematic sectional view representing a configuration of a movable sheave in a comparative example to the first embodiment.
Figure 3B:
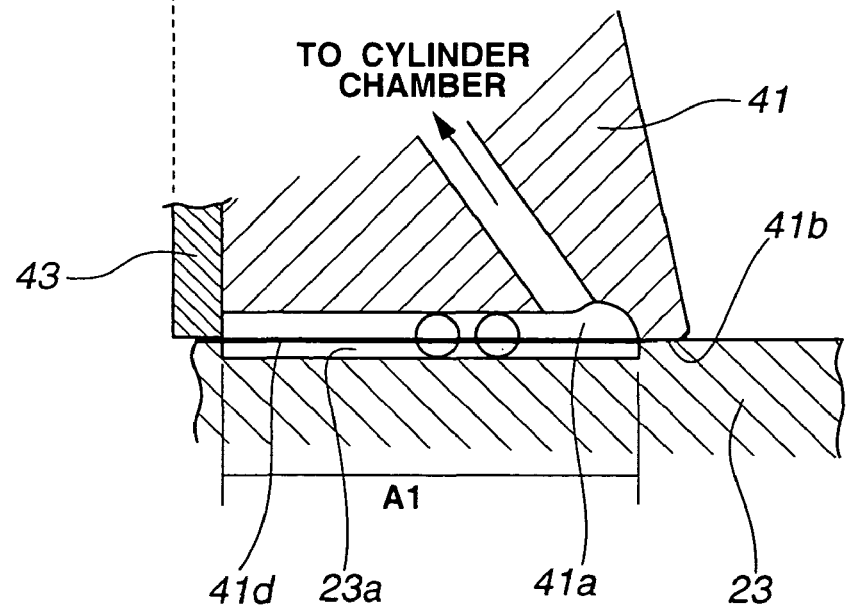
FIG. 3B is a schematic sectional view representing a configuration of a movable sheave in the first embodiment.

A configuration of the inner circumference side of movable sheave 41 will now be explained. FIGS. 3A and 3B are schematic sectional views respectively representing configurations of a movable sheave 410 in a related art (i.e., a comparative example to this embodiment) and movable sheave 41 of this embodiment. As shown in FIG. 3A, movable sheave 410 has axial groove(s) 410a which encloses a ball bearing, and a transmission input shaft 230 has a lower part 230b. This lower part 230b includes a shaft-side axial groove(s) 230a which encloses the ball bearing, in outer circumference surface thereof. A sliding surface 410d of movable sheave 410 is configured to be capable of sliding over the outer circumference surface (or, periphery) of lower part 230b. Moreover, movable sheave 410 includes an upper part 410c whose length in the axial direction is B1. Thereby, movable sheave 410 can move in the axial direction within the range B1. A sliding surface 230c within which upper part 410c slides over the outer circumference surface of transmission input shaft 230, is formed as a sealing surface 410b. Since movable sheave 410 is not supported by upper part 410c, an axial length A1 needs to be secured (or, ensured) in order to certainly support movable sheave 410. Namely, sliding surface 410d whose axial length is equal to or longer than axial length A1, is able to assuredly support movable sheave 410. Hence, it is necessary that movable sheave 410 has the length A1+B1. Therefore, the axial length of movable sheave 410 becomes long.

In this embodiment according to the present invention, as shown in FIG. 3B, movable sheave 41 does not have upper part 410c shown in FIG. 3A at the inner circumference surface thereof. Axial groove(s) 41a is formed radially outside of sealing surface 41b, and sealing surface 41b is so formed as to be able to seal always while movable sheave 41 is sliding in the axial direction. Moreover, transmission input shaft 23 also does not have lower part 230b (shown in FIG. 3A), thereby the periphery of transmission input shaft 23 has no steps (or, no barriers) as compared with the art shown in FIG. 3A. Then, shaft-side axial groove 23a which encloses the ball bearing(s) is formed in the periphery (surface) of transmission input shaft 23. The (sliding) radius of sliding surface 41d linking axial grooves 41a one another is substantially same in magnitude as the (sealing) radius of sealing surface 41b. Thereby, at least a portion of the peripheral surface of transmission input shaft 23 abuts on sealing surface 41b of movable sheave 41 under the condition where the axial position of movable sheave 41 is closest to axially fixed wall 43, and the portion of the peripheral surface of transmission input shaft 23 abuts on sliding surface 41d linking axial grooves 41a under the condition where the axial position of movable sheave 41 is remotest from axially fixed wall 43. Therefore, it is not necessary that the length B1 for the sealing surface is provided besides securing (or, providing) axial length A1 which can assuredly support movable sheave 41. Namely, the length B1 for the sealing surface is not necessary in this embodiment. Thus, the size of the continuously variable transmission can be significantly reduced (or, shortened) in the axial direction.

The advantages according to this embodiment will now be described below. The end portion of the opening of hydraulic cylinder 42 is so arranged (or, laid out) as to be overlap in the axial direction of primary pulley 4, with at least a part of bearing 13 rotatably supporting transmission input shaft 23, under the condition where the groove width of primary pulley 4 is widest (namely, under the lowest speed ratio) or in a predetermined range of axial movement of hydraulic cylinder 42 relative to axially fixed wall 43. Namely, movable hydraulic cylinder 42 is laid out to permit the opening thereof to axially overlap with at least a portion of bearing 13. Thereby, the length in the axial direction can be reduced, and the abilities (for example, flexibility) of the continuously variable transmission to be mounted into a vehicle can be increased.

Next, fixed wall 43 includes first extending portion 43a, second extending portion 43b, and third extending portion 43c. The outer (ring) radius of bearing 13 is configured to be larger than the radius of (radially) outer end of first extending portion 43a. Thereby, second support portion 12c which fixedly supports bearing 13 can be disposed without interfering with fixed wall 43. Hence, the length (or, size) can be further reduced in the axial direction.

Next, second support member 12 includes connecting portion 12a which is fixed to side-case 11, and outer ring support portion 12c which fixedly supports outer ring 13b against (or, toward) side-case 11 in the axial direction. Connecting portion 12a is so formed as to be shifted (offset) from the position of outer ring support portion 12c in the axial direction. Hence, it becomes possible that an enough area for axial (direction) movement of centrifugal cancellation space 4b is secured (or, ensured). Thereby, bearing 13 can be mounted to movable sheave 41 direction (i.e., to the right direction of FIG. 2) more than the end of the opening of hydraulic cylinder 42.

Next, a plurality of axial grooves 41a for enclosing the ball bearing(s) at (or, in) the (radially) inner surface of movable sheave 41 are provided. The (sliding) radius of sliding surface 41d linking axial grooves 41a one another is configured to be substantially same as the (sealing) radius of sealing surface 41b which seals (between) transmission input shaft 23 and the inner surface of movable sheave 41. Thereby, it is not necessary that the length B1 for the sealing surface is provided, besides securing (or, providing) axial length Al which can assuredly support movable sheave 41. Namely, the length B1 for the sealing surface is not necessary. Therefore, the considerable size reduction (of the continuously variable transmission) in the axial direction can be achieved.

Although the embodiment is explained as described above, it is needless to say that the art according to the present invention is adaptable to the secondary pulley, not limited to the primary pulley.

This application is based on a prior Japanese Patent Application No. 2004-169054 filed on Jun. 7, 2004. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A continuously variable transmission comprising:
  a primary pulley including:
    a first fixed sheave coupled with an input rotation shaft, and a first movable sheave configured to move on the input rotation shaft in an axial direction of the primary pulley; and a secondary pulley connected with the primary pulley by a belt, the secondary pulley including:
- a second fixed sheave coupled with a follower rotation shaft disposed substantially parallel to the input rotation shaft, and
- a second movable sheave configured to move on the follower rotation shaft in the axial direction, wherein at least one of the primary and secondary pulleys includes:
- an axially fixed wall configured to rotate integrally with the corresponding rotation shaft, and
- a movable cylinder, configured to move and rotate integrally with the corresponding movable sheave, cooperating with the fixed wall to define a cylinder chamber of the corresponding pulley, and having a cylindrically-shaped opening axially outside of the cylinder chamber, the movable cylinder being arranged to permit the opening to axially overlap with at least a portion of a bearing which rotatably supports the corresponding rotation shaft, wherein the axially fixed wall is placed axially between the bearing and the movable sheave of the corresponding pulley, wherein the axially fixed wall comprises a first extending portion radially extending in a form of a disc from the corresponding rotation shaft to a radially outer end of the first extending portion, and a second extending portion extending in a form of an annular ring from the radially outer end of the first extending portion toward a corresponding movable sheave side, wherein an outer radius of the bearing is larger than a radius of the radially outer end of the first extending portion, wherein the continuously variable transmission further comprises:
- a side-case configured to cover the primary and secondary pulleys in the axial direction; and
- a support member including:
  - a connecting portion fixedly connected with the side-case,
  - an outer ring support portion fixedly supporting an outer ring of the bearing from a corresponding movable sheave side, against the side-case, in the axial direction, and
  - an axially extending portion extending from the connecting portion angularly in a radial direction and the axial direction to the outer ring support portion;

wherein the axially fixed wall extends radially up to an inner circumference of the movable cylinder to define the cylinder chamber of the corresponding pulley, and wherein an axial position and a radial position of the connecting portion of the support member is offset from an axial position and a radial position of the outer ring support portion of the support member.

2. A continuously variable transmission as claimed in claim 1, wherein the opening of the movable cylinder overlaps with the bearing in a predetermined range of axial movement of the movable cylinder relative to the axially fixed wall.

3. A continuously variable transmission as claimed in claim 2, wherein the movable cylinder, the axially fixed wall, and the bearing are arranged in a transmission case in that order from the corresponding movable sheave of the corresponding pulley; and wherein the opening of the movable cylinder overlaps with the bearing under a specific condition where the movable cylinder is shifted to a predetermined axial position corresponding to a minimum volume of the cylinder chamber.

4. A continuously variable transmission as claimed in claim 1, wherein the axially fixed wall is located to be in contact with the bearing.

5. A continuously variable transmission as claimed in claim 1, wherein the first extending portion extends radially at a substantially right angle to the axial direction.

6. A continuously variable transmission as claimed in claim 1, wherein the first extending portion is located in contact with an inner ring of the bearing to fix the inner ring to the corresponding rotation shaft.

7. A continuously variable transmission as claimed in claim 1, wherein the outer ring support portion of the support member is in contact with the outer ring of the bearing.

8. A continuously variable transmission as claimed in claim 7, wherein the first extending portion radially extends at a substantially right angle to the axial direction, and wherein the first extending portion is located in contact with an inner ring of the bearing.

9. A continuously variable transmission as claimed in claim 8, wherein both the first extending portion of the axially fixed wall and the outer ring support portion of the support member fixedly support the bearing on an identical side of the bearing relative to the axial direction.

10. A continuously variable transmission as claimed in claim 1, wherein the axially extending portion extends from the connecting portion to the outer ring support portion in a direction to the corresponding movable sheave.

11. A continuously variable transmission as claimed in claim 1, wherein the movable cylinder is in a substantially bottomed-cylindrical shape, and wherein a centrifugal cancellation plate is attached to an end portion of the opening of the movable cylinder to retain centrifugal hydraulic pressure between the centrifugal cancellation plate and the axially fixed wall.

12. A continuously variable transmission as claimed in claim 1, wherein the corresponding movable sheave is formed with:
- a plurality of axial grooves enclosing a ball bearing, in a radially inner surface of the corresponding movable sheave,
- a sliding surface linking the axial grooves to one another, and
- a sealing surface which seals a peripheral surface of the corresponding rotation shaft and the radially inner surface of the corresponding movable sheave, wherein the sealing surface is configured to have the substantially same radius as the sliding surface with respect to a rotation axis of the corresponding pulley.

13. A continuously variable transmission as claimed in claim 12, wherein the plurality of axial grooves of the movable sheave are formed radially outside of the sealing surface.

14. A continuously variable transmission as claimed in claim 12, wherein the corresponding rotation shaft is formed with a plurality of axial grooves in a radially outer surface of the corresponding rotation shaft, the plurality of axial grooves of the corresponding rotation shaft cooperating with the plurality of axial grooves of the corresponding movable sheave to enclose the ball bearing; and wherein the sealing surface has the substantially same radius as the sliding surface so as to allow at least a part of the axial grooves of the corresponding movable sheave to move on the sealing surface in a direction axially away from the axially fixed wall.

15. A continuously variable transmission as claimed in claim 12, wherein at least a portion of the peripheral surface of the corresponding rotation shaft abuts on the sealing surface of the corresponding movable sheave under a condition where a position of axial movement of the corresponding movable sheave is closest to the axially fixed wall; and wherein the portion of the peripheral surface of the corresponding rotation shaft abuts on the sliding surface linking the axial grooves to one another under a condition where a position of axial movement of the corresponding movable sheave is remotest from the axially fixed wall.

16. A continuously variable transmission as claimed in claim 1, wherein a circumferential wall of the movable cylinder extends on either side of the opening of the movable cylinder in the axial direction such that a section of the movable cylinder overlaps with a section of the bearing.

* * * * *